United States Patent [15] 3,659,082
Rolfe [45] Apr. 25, 1972

[54] ELECTRICAL CIRCUITRY FOR LOGARITHMIC CONVERSION

[72] Inventor: Norman Frederick Ferdinand Joseph Rolfe, Wakefield, Mass.

[73] Assignee: Instrumentation Laboratory Inc., Lexington, Mass.

[22] Filed: June 12, 1970

[21] Appl. No.: 45,705

[52] U.S. Cl. .......................... 235/150.53, 235/193, 235/197, 328/145, 307/229

[51] Int. Cl. .......................... G06g 7/24

[58] Field of Search .............235/150.53, 193, 197; 328/145, 328/142; 307/229, 230; 324/132

[56] References Cited

UNITED STATES PATENTS

| | | | |
|---|---|---|---|
| 2,870,409 | 1/1959 | Bigelow | 324/132 |
| 2,868,968 | 1/1959 | Rich | 328/145 X |
| 3,237,111 | 2/1966 | Coates, Jr. et al. | 328/145 X |

*Primary Examiner*—Joseph F. Ruggiero
*Attorney*—Willis M. Ertman

[57] ABSTRACT

A log converter circuit has converter and reference transistors connected in differential pair relation. An operational amplifier is connected in circuit with each transistor and a storage circuit is arranged to apply an output of the circuit to the reference transistor. A switch is connected between the output of the log converter circuit and the storage circuit for interrupting application of symetrical signal from the log converter circuit to the storage circuit.

19 Claims, 2 Drawing Figures

ELECTRICAL CIRCUITRY FOR LOGARITHMIC CONVERSION

SUMMARY OF INVENTION

Figures 1, 2:
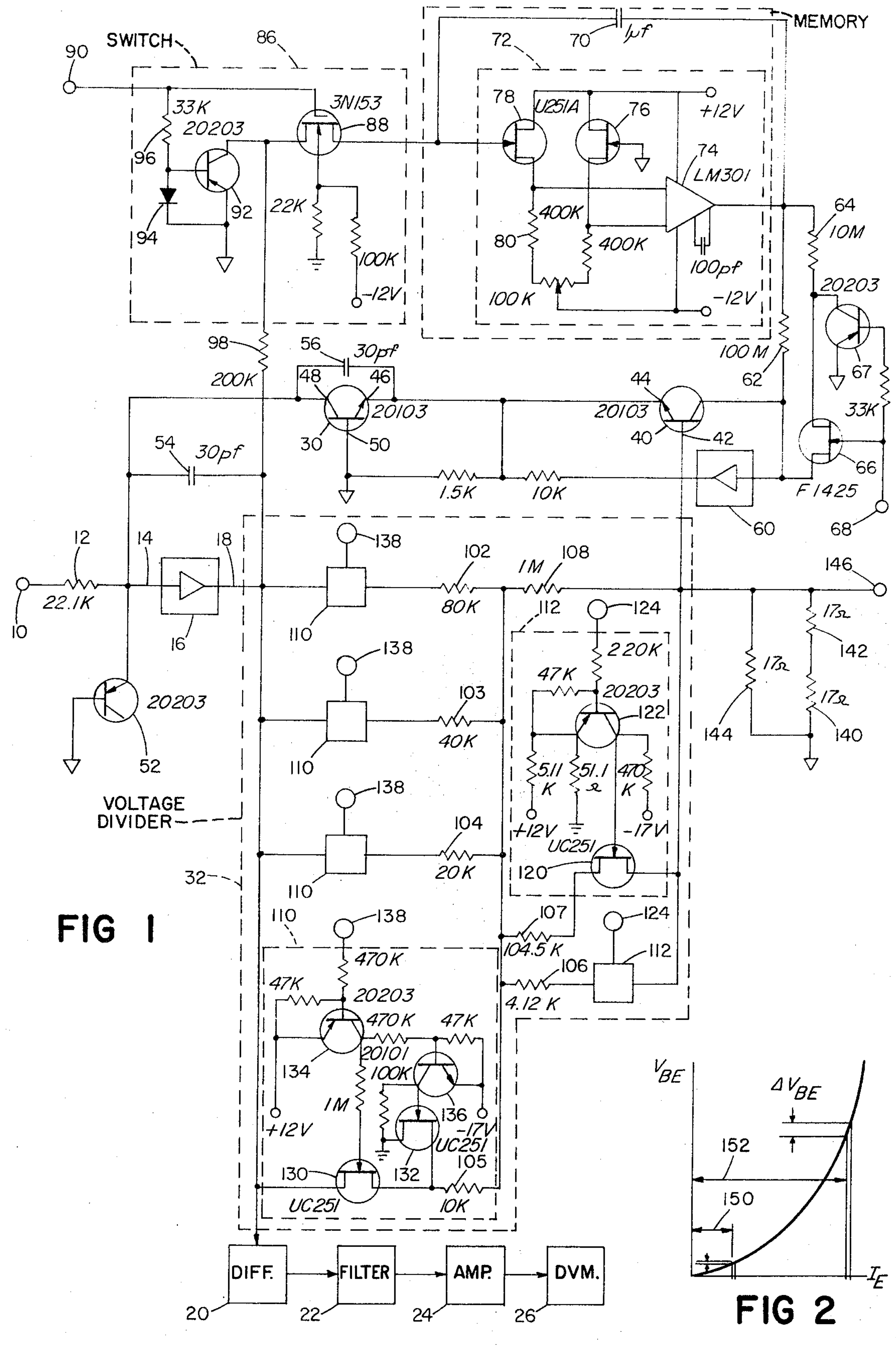

This invention relates to electrical circuitry and more particularly to circuitry for producing an electrical output that is logarithmically related to an input signal.

Circuitry for generating output signals as a logarithmic function of an input signal are useful in many areas of signal processing. For example, an output signal as a logarithmic function of an input signal frequently provides useful data as in a photometer where absorbance is logarithmically related to a parameter of interest. In such measurement systems the signal of interest is often quite small as compared with the background signal.

It is a particular object of this invention to provide novel and improved circuitry for processing small signals that have a large background signal.

Another object of the invention is to provide a novel and improved logarithmic converter circuit.

Still another object of the invention is to provide a logarithmic converter circuit that has excellent temperature stability characteristics.

Another object of the invention is to provide a novel and improved logarithmic converter circuit that permits operation in a high gain mode for small data signals with a large background signal.

In accordance with the invention, there is provided in combination with a logarithmic conversion circuit, a memory circuit for storing an output signal from the logarithmic conversion circuit as a function of a background signal applied to the input of the logarithmic conversion circuit, means for applying the stored signal value to the logarithmic conversion circuit as a balancing reference signal, and means for disconnecting the memory circuit from the output of the logarithmic conversion circuit so that the logarithmic conversion circuit in response to a signal representative of a sample to be measured applied to the input of the logarithmic conversion circuit produces a log S – log B signal.

In a particular embodiment the logarithmic conversion circuit employs a pair of transistors connected in differential pair relation, each transistor being connected in the feedback loop of an operational amplifier, and the memory circuit provides as a reference current to the reference amplifier, a signal that is a function of the sensed background signal. Also, in preferred embodiments the circuitry includes means for adjusting the amplification factor of the logarithmic conversion circuitry, and in a particular embodiment this amplification adjustment means is a digitally controlled voltage dividing network having two sections, a first section providing a digital gain value and a second section providing a multiplication factor.

Circuits constructed in accordance with the invention have excellent temperature stability characteristics and permit a high gain mode of operation that is particularly useful in applications where the magnitude of the data signal is small compared with the magnitude of the background signal. Substantial amplification factors are available without overloading output circuitry connected to the converter circuitry. Further, circuits constructed in accordance with the invention utilizing a differential pair arrangement of transistors have excellent temperature stability as the currents through the converter and reference transistors are maintained in close tracking relation.

Other objects, features and advantages of the invention will be seen as the following description of a particular embodiment progresses, in conjunction with the drawing, in which:

FIG. 1 is a schematic diagram of circuitry constructed in accordance with the invention; and FIG. 2 is a graph indicating operation of the circuitry shown in FIG. 1.

DESCRIPTION OF PARTICULAR EMBODIMENT

With reference to the drawing, the circuitry has an input terminal 10 to which an input signal is applied. In this particular embodiment terminal 10 is connected to a photodiode in a photometer system in which the background current is in the order of 100 nanoamperes and may vary from 1 nanoampere to 1 microampere or more and the signal change to be detected is a small fraction of background current, the circuit being particularly useful where the data signal is less than 1 percent of the background signal and in this embodiment a typical data signal value is in the order of 0.1 nanoamperes. The signal applied at input 10 is applied through resistor 12 to the input 14 of the forward amplifier 16 that includes an operational amplifier stage. The output of amplifier 16 is applied over output line 18 in a particular embodiment through a differentiating circuit 20, a filter network 22, and an absolute value amplifier 24 to digital voltmeter device 26.

Log converter transistor 30 is connected in the feedback path around operational amplifier 16 and in circuit with a digitally programmed voltage divider 32, and a reference transistor 40. Transistors 30 and 40 are preferably matched, so that their responses are within 10 millivolts of one another at the current in the center of the operating range (although advantages are obtained without specific matching selection of the transistors). The base electrode 42 of transistor 40 is connected to the voltage divider network and the emitter 44 of reference transistor 40 is connected to emitter 46 of converter transistor 30 while the collector 48 of converter transistor 30 is connected to the input of amplifier 16 and the base of transistor 30 is grounded. The emitter-base junction of transistor 52 provides a clamp to ground. Capacitors 54 and 56 provide stabilizing functions.

Transistor 40 is in the feedback loop of reference current source amplifier 60 that is similar to forward amplifier 16. Negative feedback forces the collector current of reference transistor 40 to equal the current through resistor 62 (or the parallel combination of resistors 62 and 64 when switch 66 is operated in response to an input at terminal 68). Resistor 62 is connected to the output of a memory circuit that includes capacitor 70 and zeroing amplifier 72 which is similar to forward amplifier 16 and reference current source amplifier 60. Each of those circuits includes an operational amplifier 74 and a pair of junction field effect transistors 76, 78 connected in circuit with resistors 80, 82 and 84 to provide an adjustable voltage offset. In the forward amplifier, the gate of the transistor corresponding to transistor 76 is connected to a voltage source to give better logarithm conformity at low current levels. Connected to the input of the memory circuit is a switch 86 that employs an insulated gate field effect transistor 88, the gate of which is connected to zeroing input terminal 90. Transistor 92, diode 94 and resistor 96 provide a protective circuit which reduces the voltage across field effect transistor 88. Output line 18 is connected to switch 86 via resistor 98.

The digitally programmed voltage divider 32 includes two sections, a digit section that includes resistor elements 102–105 and a multiplier section that includes resistor elements 106–108, the resistor elements in each section being related to one another in a graduated series. A switch unit 110 is connected in series with each resistor 102–105 and a switch unit 112 is connected in series with each resistor 106 and 107. Each switch unit 110 either connects its resistor to ground or to output line 18 while each switch unit 112 either connects its resistor to common line 114 or removes it from the circuit. Each switch unit 112 includes a field effect transistor 120 controlled by a transistor switch 122 from an input terminal 124 to which a control signal is applied and each switch unit 110 includes two field effect transistors 130, 132 controlled via transistors 134, 136 from terminal 138 so that its resistor is either connected to ground through transistor 132 or to the output line 18 through transistor 130. Also connected to network 32 is a temperature compensation network including nickel resistor 140, and resistors 142 and 144; and offset terminal 146. The temperature compensation reduces the temperature coefficient of the volts/decade gain. After zeroing a second input signal may be applied to terminal 140, providing a convenient manner of subtracting one signal from another. This digitally programmed voltage divider network allows selection of the volts per decade response of the system over the range of values from one volt per decade to 1,500 volts per decade.

In operation, the circuitry is set by appropriately selecting a suitable range value as by application of a control signal at range control terminal 68 (This range value maintaining a desired voltage level at the output of the memory circuit, and in this embodiment that value being desirably maintained between 200 millivolts and 10 volts.); and a suitable system volts/decade response value through selection of one or more resistors in the voltage divider network 32 via terminals 124 and 138. A reference (in a particular embodiment a blank solution) is positioned between a light source and the photodiode for sensing by the photodiode and a signal at terminal 90 closes the FET switch 88. The output signal from the forward amplifier 16 is supplied through resistor 98 to the memory circuit and the resulting signal is applied through resistor 62 (or the parallel combination of resistors 62 and 64 depending on the condition of range switch 66) to apply a current which opposes the input current so that the output on line 18 is zero. This resulting signal from zeroing circuit 72 is stored by capacitor 70.

After the circuitry has been zeroed to adjust the current in the reference transistor 40, switch 88 is opened by a signal at terminal 90 and the specimen to be measured is positioned for sensing by the photodiode.

The compensating current from source 60 as a function of the blank signal (log $A_b$) maintains the collector current of transistor 40 constant. The emitter base voltage of reference transistor 40 also remains constant and therefore only the emitter base voltage of converter transistor 30 varies with the change in input current and the output on line 18 is a compensated signal (log $A_s$–log $A_b$) and is applied to the output circuitry.

The background current through the converter and reference transistors 30 and 40 can vary over several decades and the voltage across the reference current resistor 62 varies corresponding. Such variation produces an undue strain on the memory capacitor 70 particularly at low voltages and by adjusting the range value (resistor 62) this voltage may be adjusted to an improved value.

With reference to FIG. 2, the background current ($I_E$), as indicated above, can vary over a large range and the data signal is a small fraction of that background current. The circuit is adjusted to provide a zero output at a background current for example current 150 or current 152. By adjusting the reference current supplied to amplifier 60 to be the same as the background current, the amplification of the $\Delta V_{BE}$ (output) signal resulting from the superposition of the data signal on the background signal can be much greater without introducing saturation. Similarly, the circuit has excellent temperature stability as the circuitry maintains the current flow through the converter and reference transistors substantially equal in the small signal mode of data processing.

Other embodiments of this invention will occur to those skilled in the art which are within the spirit and scope of the following claims.

What is claimed is:

1. In combination with a logarithmic conversion circuit, a memory circuit connected to the output of said logarithmic conversion circuit for storing an output signal from said logarithmic conversion circuit as a function of a background signal applied to the input of said logarithmic conversion circuit, means for applying the stored signal value to said logarithmic conversion circuit as a balancing reference signal so that the output signal of said logarithmic conversion circuit is zero, and means for disconnecting said memory circuit from the output of said logarithmic conversion circuit while maintaining the application of said balancing reference signal to said logarithmic conversion circuit from said memory circuit so that said logarithmic conversion circuit in response to a signal representative of a sample to be measured applied to the input of the logarithmic conversion circuit produces an output signal that is the difference between the logarithm of said background signal and the logarithm of said sample signal.

2. The combination as claimed in claim 1 wherein said logarithmic conversion circuit employs a semi-conductor junction as a logarithmic impedance device.

3. In combination with a logarithmic conversion circuit, a memory circuit for storing an output signal from said logarithmic conversion circuit as a function of a background signal applied to the input of said logarithmic conversion circuit, said memory circuit having an input connected to the output of said logarithmic conversion circuit and an output, a background current range switch connected in circuit between the output of said memory circuit and said logarithmic conversion circuit, means for applying the signal value stored in said memory circuit to said logarithmic conversion circuit as a balancing reference signal so that the output signal of said logarithmic conversion circuit is zero, and means for disconnecting said memory circuit from the output of said logarithmic conversion circuit while maintaining the application of said balancing reference signal to said logarithmic conversion circuit from said memory circuit so that said logarithmic conversion circuit in response to a signal representative of a sample to be measured applied to the input of the logarithmic conversion circuit produces an output signal that is the difference between the logarithm of said background signal and the logarithm of said sample signal.

4. In combination, a logarithmic conversion circuit, means for adjusting the amplification factor of said logarithmic conversion circuit, a memory circuit connected to the output of said logarithmic conversion circuit for storing an output signal from said logarithmic conversion circuit as a function of a background signal applied to the input of said logarithmic conversion circuit, means for applying the stored signal value to said logarithmic conversion circuit as a balancing reference signal so that the output signal of said logarithmic conversion circuit is zero, and means for disconnecting said memory circuit from the output of said logarithmic conversion circuit while maintaining the application of said balancing reference signal to said logarithmic conversion circuit from said memory circuit so that said logarithmic conversion circuit in response to a signal representative of a sample to be measured applied to the input of the logarithmic conversion circuit produces an output signal that is the difference between the logarithm of said background signal and the logarithm of said sample signal.

5. The combination as claimed in claim 4 wherein said amplification adjusting means includes a digitally controlled voltage divider network.

6. The combination as claimed in claim 5 wherein said digitally controlled voltage divider network includes a first section that defines a digital value and a second section that defines a multiplication factor.

7. In combination, a logarithmic conversion circuit including a converter transistor and a reference transistor connected in differential pair relation, a memory circuit connected to the output of said logarithmic conversion circuit for storing an output signal from said logarithmic conversion circuit as a function of a background signal applied to the input of said logarithmic conversion circuit, means for applying a current as a function of the stored signal value to said reference transistor of said differential pair as a balancing reference signal so that the output signal of said logarithmic conversion circuit is zero, and means for disconnecting said memory circuit from the output of said logarithmic conversion circuit while maintaining the application of said balancing reference signal to said logarithmic conversion circuit from said memory circuit so that said logarithmic conversion circuit in response to a signal representative of a sample to be measured applied to the input of the logarithmic conversion circuit produces an output signal that is the difference between the logarithm of said background signal and the logarithm of said sample signal.

8. The combination as claimed in claim 7 and further including a background current range switch connected in circuit between said memory circuit and the reference transistor of said differential pair.

9. The circuit as claimed in claim 7 and further including an operatinal amplifier coupled to each transistor of said differential pair, each transistor being connected in the feedback loop of its corresponding operational amplifier.

10. In combination with a logarithmic conversion circuit, a memory circuit including a storage capacitor connected to the output of said logarithmic conversion circuit for storing an output signal from said logarithmic conversion circuit as a function of a background signal applied to the input of said logarithmic conversion circuit, means for applying the stored signal value to said logarithmic conversion circuit as a balancing reference signal so that the output signal of said logarithmic conversion circuit is zero, and means for disconnecting said memory circuit from the output of said logarithmic conversion circuit including a switch having a high impedance in its open condition so that a charge on said capacitor as a function of the background signal is maintained and generates a balancing reference signal and applies said reference signal from said memory circuit to said logarithmic conversion circuit so that said logarithmic conversion circuit in response to a signal representative of a sample to be measured applied to the input of the logarithmic conversion circuit produces an output signal that is the difference between the logarithm of said background signal and the logarithm of said sample signal.

11. A logarithmic converter circuit comprising an input, an output, a converter transistor and a reference transistor connected in differential pair relation between said input and said output for providing a signal at said output as a logarithmic function of a signal applied at said input, an operational amplifier connected in circuit with each said transistor, circuitry including storage means for applying an output of said logarithmic converter circuit to said reference transistor and switch means connected between said output of said logarithmic converter circuit and said storage means for interrupting the application of said signal to said storage means during a sample measurement operation while said storage means continues to apply a signal to said reference transistor so that said circuit produces a data signal that is incrementally related to a background signal.

12. The circuit as claimed in claim 11 and further including a background current range switch connected in circuit between said memory circuit and the reference transistor of said differential pair.

13. A logarithmic converter circuit comprising an input, an output, a converter transistor and a reference transistor connected in differential pair relation between said input and said output for providing a signal at said output as a logarithmic function of a signal applied at said input, means for adjusting the amplification factor of said logarithmic converter circuit, circuitry including storage means for applying an output of said logarithmic converter circuit to said reference transistor, and switch means connected between said output of said logarithmic converter circuit and said storage means for interrupting the application of said signal to said storage means during a sample measurement operation while said storage means continues to apply a signal to said reference transistor so that said circuit produces a data signal that is incrementally related to a background signal

14. The circuit as claimed in claim 13 wherein said amplification adjusting means includes a digitally controlled voltage divider network.

15. The circuit as claimed in claim 14 and further including a temperature compensation network connected to said amplification factor adjusting means for reducing the temperature coefficient of the volts/decade gain.

16. The circuit as claimed in claim 14 wherein said digitally controlled voltage divider network includes a first section that defines a digital value and a second section that defines a multiplication factor.

17. The circuit as claimed in claim 16 wherein said storage means is a capacitor connected in the feedback loop of an operational amplifier and said switch means has a high impedance in its open condition so that a charge on said capacitor as a function of the background signal is maintained and generates a balancing reference signal for application to said reference transistor.

18. The circuit as claimed in claim 15 and further including a background current range switch connected in circuit between said memory circuit and the reference transistor of said differential pair.

19. The circuit as claimed in claim 18 and further including a temperature compensation network connected to said voltage divider network for reducing the temperature coefficient of the volts/decade gain.

* * * * *